July 2, 1935.  E. HIRVONEN  2,007,051
VALVE FOR RANGE OIL BURNERS
Filed June 9, 1933
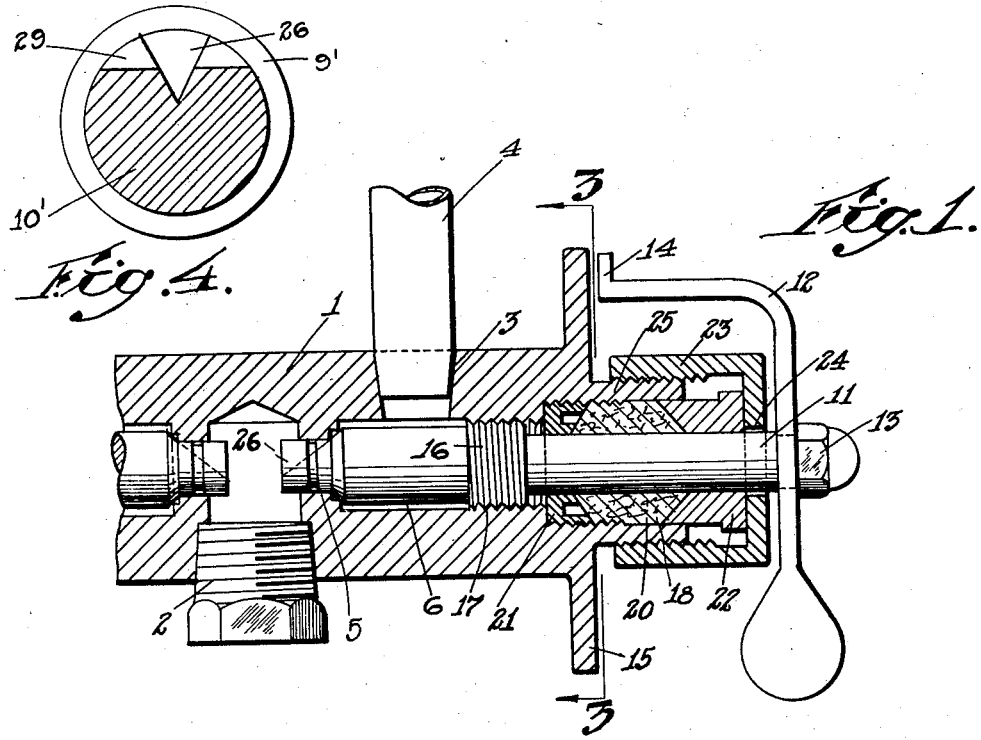
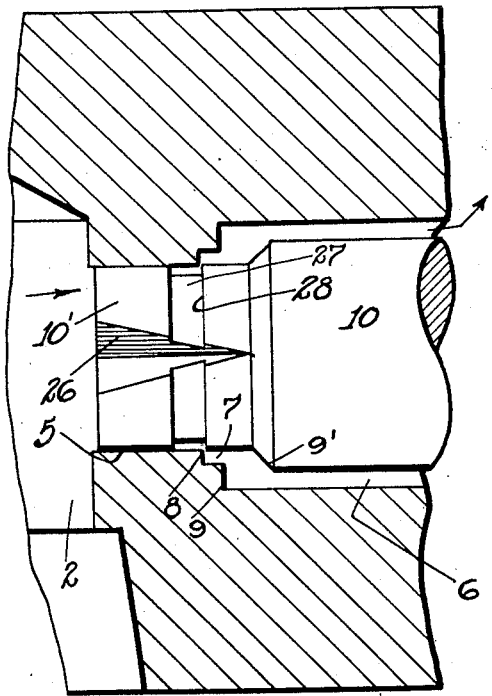
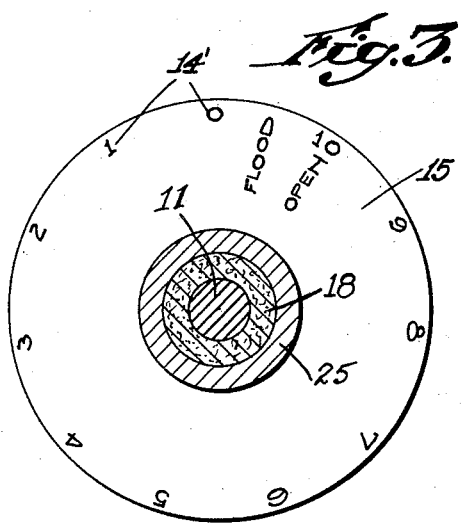
Inventor
Eric Hirvonen
By Charles A Warren
Attorney Patented July 2, 1935

2,007,051

UNITED STATES PATENT OFFICE 2,007,051

VALVE FOR RANGE OIL BURNERS

Eric Hirvonen, Auburn, Mass., assignor to Worcester Taper Pin Company, Worcester, Mass., a corporation of Massachusetts Application June 9, 1933, Serial No. 675,072

5 Claims. (Cl. 251—34)

The present invention relates to a valve construction by which the rate of flow of fluid therethrough may be carefully metered; the invention is particularly applicable to valves for use in range oil burners.

In prior devices of this character, the valve is formed with a metering slot, the area of which increases as the valve stem is turned for opening of said valve so that the amount of liquid passing through the valve is proportional to the opening of said valve and may accordingly be accurately adjusted. Although this type of valve is entirely satisfactory during the operation of an oil burner, it does not provide for rapid filling of the base of the burner with fuel oil for igniting of said burner without the necessity for turning said valve a substantial amount beyond the normal maximum opening thereof. It is accordingly the principal object of the present invention to provide a valve construction by which the flow of liquid therethrough may be metered up to a predetermined maximum point and thereafter by a slight further opening of the valve to provide for a greatly increased flow of fluid. Other objects and advantages of the invention, and the structure by which the invention is carried out, will more fully appear from the following detailed description taken in connection with the accompanying drawing, in which:—

Fig. 1 is a sectional view through a valve embodying the invention.

Fig. 2 is an enlarged fragmentary sectional view with the valve in open position showing the metering structure of the valve.

Fig. 3 is a sectional view substantially along the line 3—3 of Fig. 1, looking in the direction of the arrows.

Fig. 4 is a fragmentary sectional view illustrating a modified form of valve member.

Like reference characters refer to like parts in the different figures.

Referring to Fig. 1, the device comprises a valve casing 1 having an inlet port 2 connected by a conduit, not shown, to a source of fuel oil. The casing 1 has an outlet port 3 connected by a pipe 4 to a burner, not shown, in a suitable heater or range. A horizontal channel 5 in the casing provides a fluid connection between the inlet port 2 and a chamber 6 in said casing which connects with the outlet port. An annular groove 7 in the casing at the chamber end of the channel 5 and larger in diameter than said channel provides spaced annular shoulders 8 and 9 of different diameters at the end of said channel, and the flow of fuel oil through the channel 5 is controlled by a valve member 10, the inner end 10' of which is cylindrical to form a substantially tight sliding fit in the channel 5. The valve member 10 is provided with a conical surface 9' forming a seat which engages the annular shoulder 9 in the casing for positively cutting off the flow of fuel oil between the inlet and outlet ports when the valve is in closed position. An outwardly extending stem 11 on the valve member has a handle 12 secured thereto as by a clamping nut 13, and said handle has an indicating portion 14 which cooperates with indicia 14', Fig. 3, on a flange 15 forming a part of the casing 1.

The valve stem is provided substantially midway of its length with an enlarged threaded portion 16 which engages with an internally threaded portion 17 of the casing 1 at the right hand end of the chamber 6. Beyond the threaded portion 16 the valve stem passes through packing 18 which is positioned in an annular recess 20 in the casing between packing rings 21 and 22, the latter being retained in position by an internally threaded cap 23. Said cap has an opening 24 therethrough for the valve stem 11 and the threaded portion thereof engages an externally threaded portion 25 of the casing.

The cylindrical portion 10' of the valve member which is received in the horizontal channel 5 has a V-shaped notch 26 therein with the point of said notch coinciding with the inner edge of the valve seat 9', said notch increasing in cross-sectional area from the point thereof to the end of the cylindrical portion 10' of the valve member. The point of said notch also coincides, when the valve is in closed position, with the shoulder 8 at the end of the channel 5. Said notch, by its varying area, provides a metering slot by which the flow of oil from the inlet port into the chamber 6 is controlled, so that the amount of fuel oil entering said chamber is proportional to the angular opening movement of the valve member. The cylindrical portion of the valve member also has an annular groove 27 formed therein in spaced relation to the valve seat 9', said groove intersecting the V-shaped notch 26, as best indicated in Fig. 2.

The valve member is in closed position in Fig. 1. As the valve stem is turned, the cooperating threaded portions 16 and 17 procure axial movement of said member to the right, thereby separating the valve seat 9' from the shoulder 9 and permitting fluid to flow from the inlet port through the metering notch 26, the latter being withdrawn from within the channel 5 and opening into the recess 7 as the valve is opened. As the valve stem is turned to a greater extent, the area of the notch opening to the right of the shoulder 8 increases to a maximum at which time the right hand surface 28 of the annular groove 27 is in alinement with the annular shoulder 8. In this position of the valve member, which is preferably indicated on the flange 15 as the "Open" position, Fig. 3, the flow of fuel oil is still controlled by the metering notch. A slight additional turning movement of the valve stem in the same direction to the "Flood" position will then open the entire periphery of the groove 27 to the recess 7 and thus to the chamber 6 as indicated in Fig. 2, thereby greatly increasing the flow of fluid into said chamber. Further opening movement of the valve member from the flooding position of Fig. 2, is preferably limited by engagement of the enlarged portion 16 of the valve stem with the packing ring 21.

When the above described valve construction is used in connection with an oil burner, the metering notch 26 provides for accurate control of the amount of fuel oil entering the base of the burner during the operation of said burner, since the amount of oil passing through said notch is proportional to the angular opening of the valve member as indicated by the indicating portion 14 of the handle. For starting a burner, however, it is desirable to fill the base of the burner with oil and the present valve construction provides for rapid filling of the base by a slight turning movement of the valve stem beyond the maximum metering opening thereof. After the burner is lighted, a very slight closing of the valve again permits the amount of fuel oil flowing to said burner to be accurately metered.

Referring now to Fig. 4, instead of a flooding groove extending entirely around the periphery of the cylindrical valve portion 10', substantially the same result can be obtained by the provision of a slot 29 intersecting the metering notch 26. While the slot 29 will not permit of as rapid flooding of the burner as with the groove 27, it will be sufficient for certain types of burners, and obviously the depth of the slot 29 may be varied to give the desired flooding effect.

I claim,

1. In a valve construction, a valve casing having a cylindrical channel therein, a valve member having a cylindrical portion engaging said channel, said portion having a metering notch therein, said notch varying uniformly in cross-sectional area longitudinally of the axis of said cylindrical portion, said notch being opened for a flow of fluid through said notch by a longitudinal movement of said valve member in said channel, said portion also having a flooding groove intersecting said notch in a plane transverse to the axis of said valve.

2. In a valve construction, a valve casing having a cylindrical channel therein, a valve member having a cylindrical portion engaging said channel, said portion having a metering notch therein, said notch varying uniformly in cross-sectional area longitudinally of the axis of said cylindrical portion, said notch being opened for a flow of fluid through said notch by a longitudinal movement of said valve member in said channel, said portion also having an annular groove intersecting said notch in spaced relation to the end of said notch.

3. In a valve construction, a valve casing having inlet and outlet ports and a channel connecting said ports, a valve member in said channel having a metering notch therein, said notch varying uniformly in cross-sectional area longitudinally of the axis of said valve member, said notch being opened for a flow of fluid through said notch by a longitudinal movement of said valve member in said channel, said member also having an annular groove intersecting said notch in spaced relation to the end of said notch.

4. In a valve construction, a casing member having a channel therein, a valve member engaging said channel, one of said members having a metering notch therein, the latter varying in cross-sectional area throughout the length thereof and being opened for a flow of fluid through said notch by a relative longitudinal movement of said valve member in said channel, the member having the notch also having an annular groove intersecting said notch in spaced relation to the end thereof.

5. In a valve construction, a casing member having a cylindrical channel therein and a valve seat at one end of said channel, a valve member engaging said channel and having an annular valve surface thereon cooperating with the valve seat in the casing member when said valve member is seated, said valve member having a metering notch therein, with the end of said notch coinciding substantially with the edge of the valve surface on said valve member, the latter also having an annular groove intersecting said notch in spaced relation to the end thereof.

ERIC HIRVONEN.